INVENTORS
LAWRENCE E. BROWN
PHILLIP T. JONES
BY *Harry E. Wise*
ATTORNEY

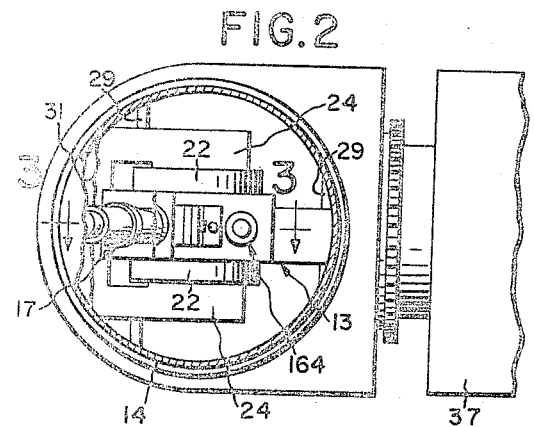
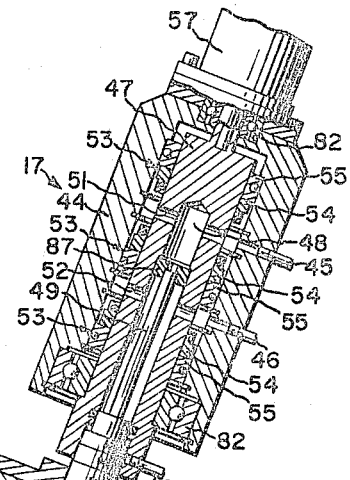
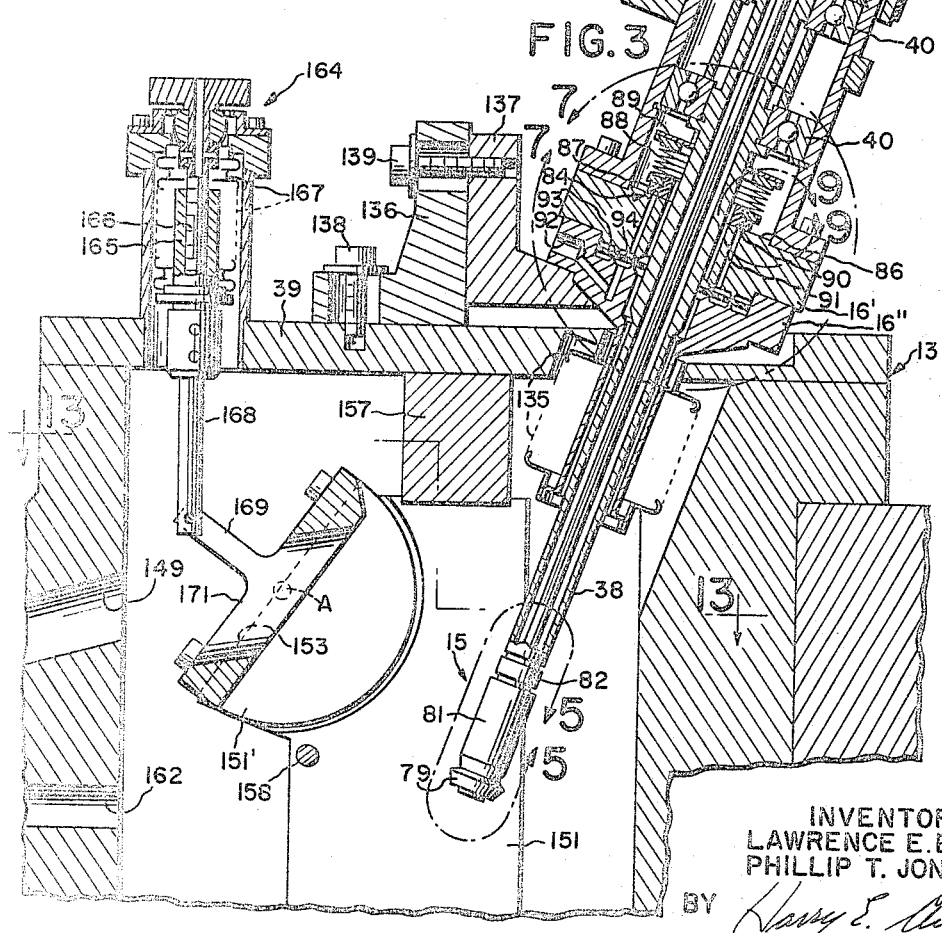

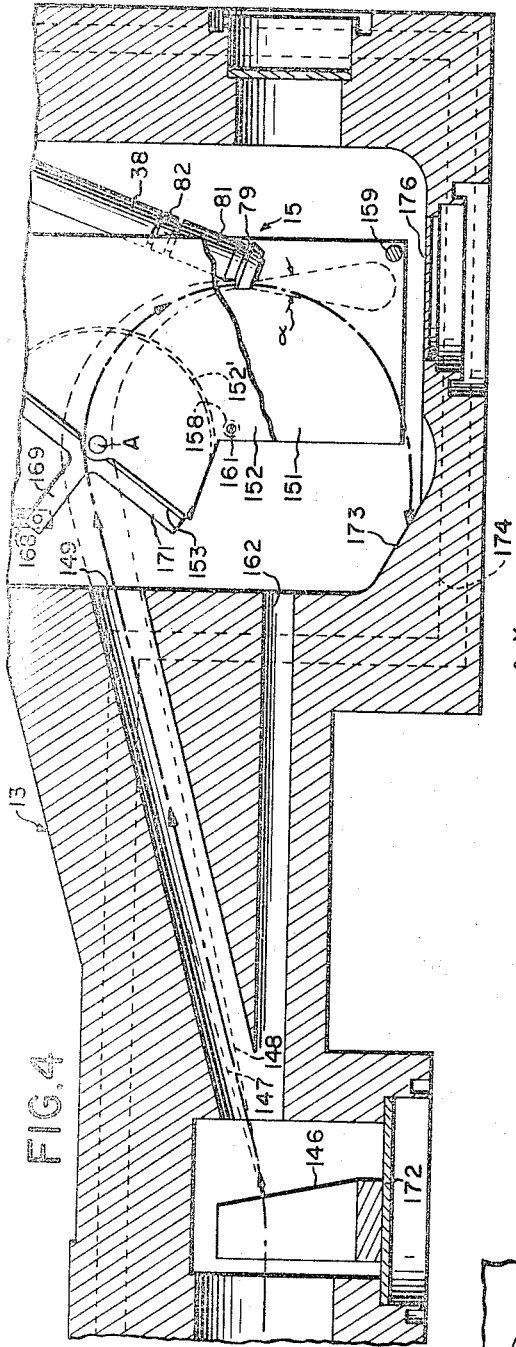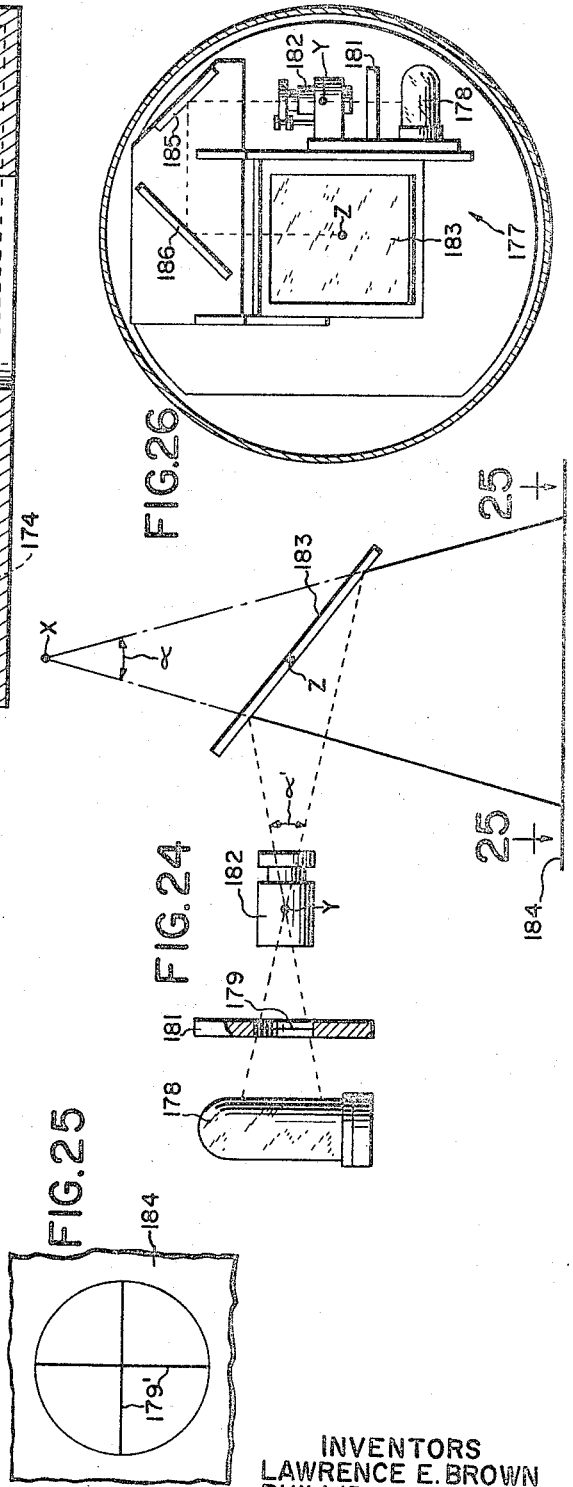

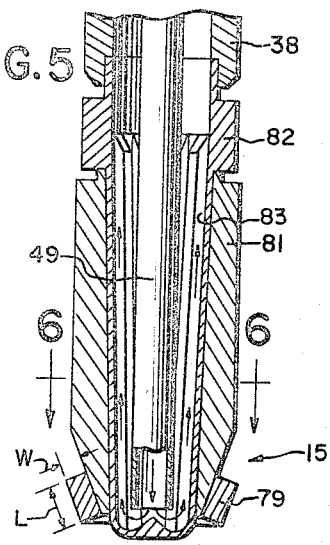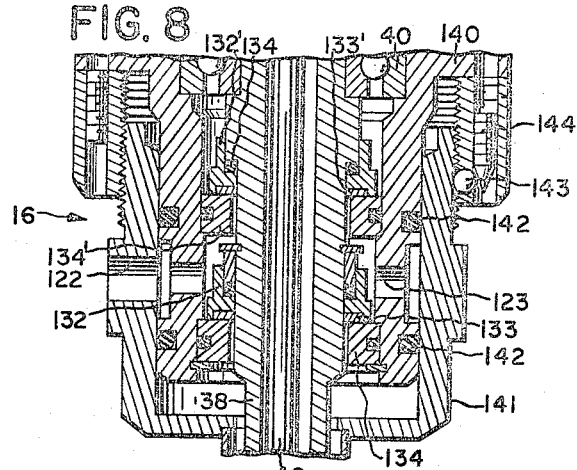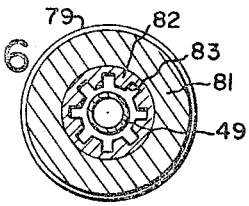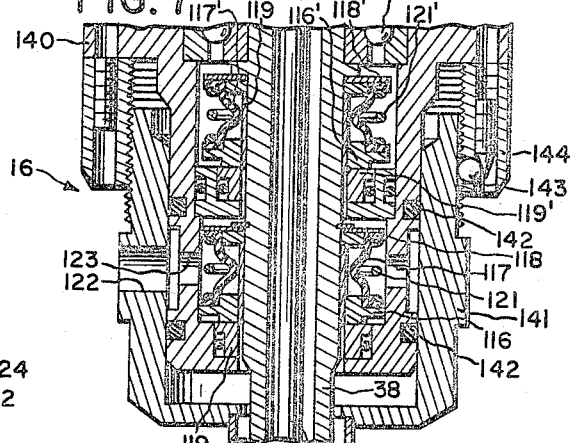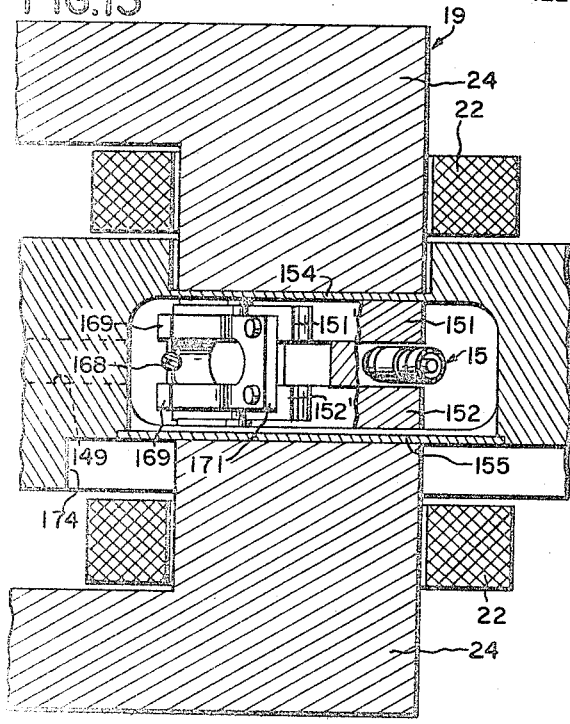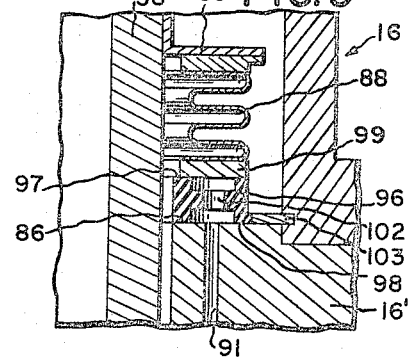

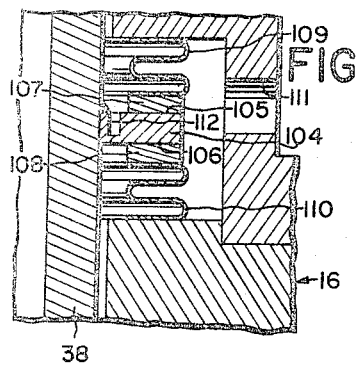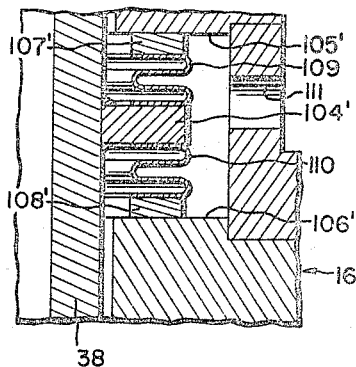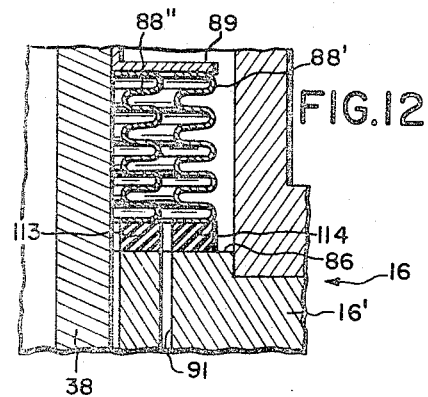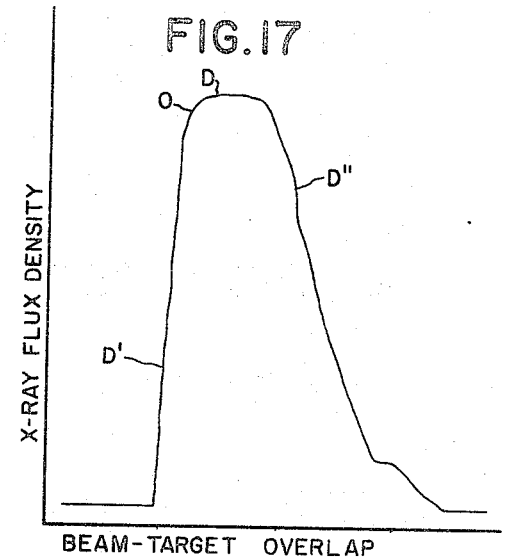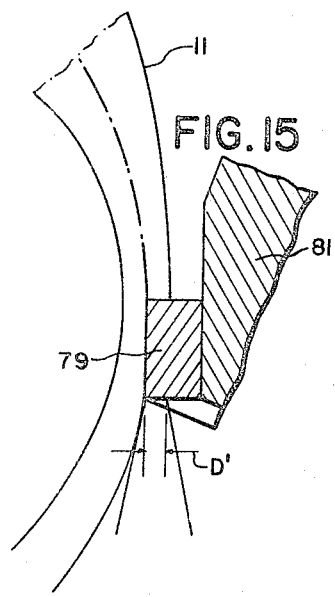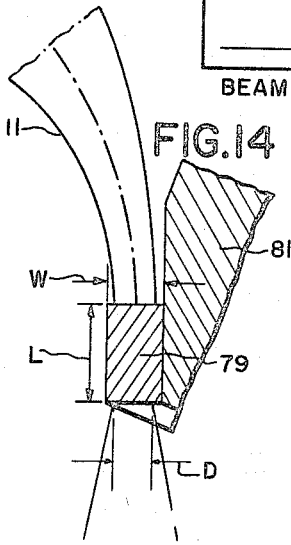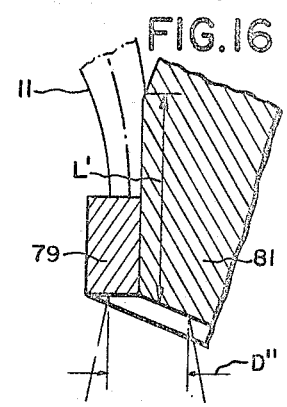

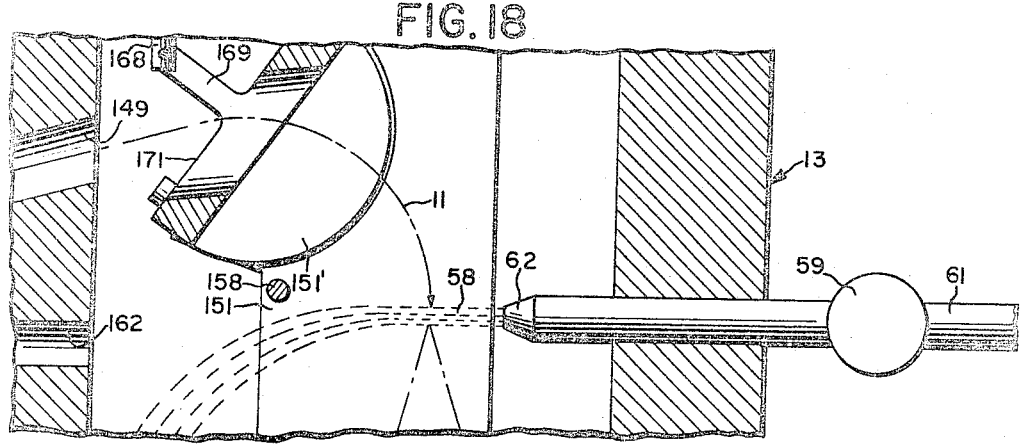
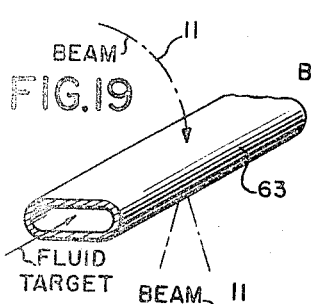
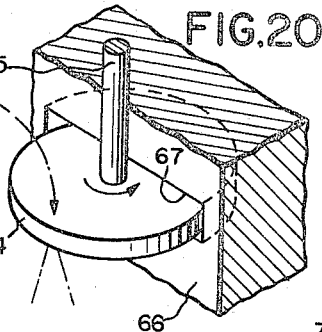
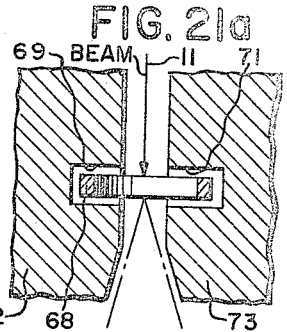
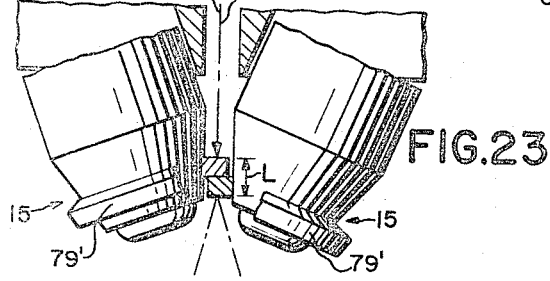
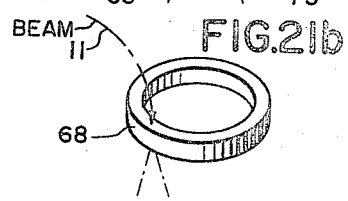
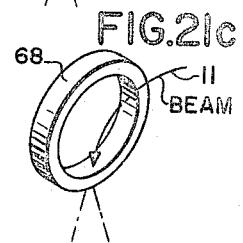
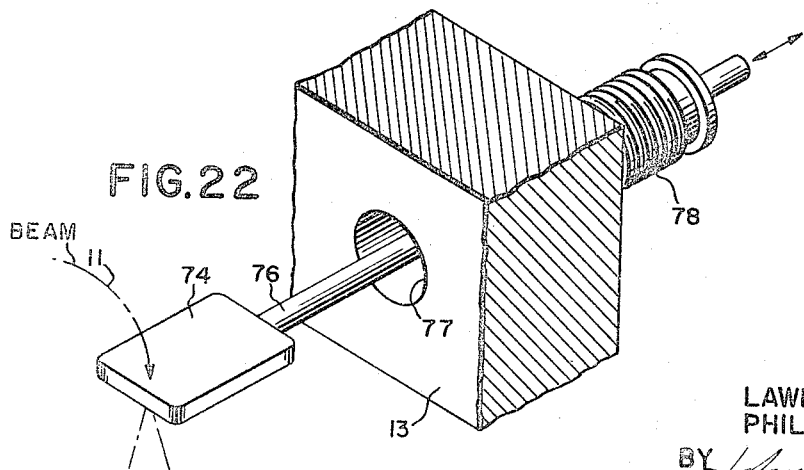

United States Patent Office 3,331,978
Patented July 18, 1967

3,331,978
ELECTRON BEAM X-RAY GENERATOR WITH MOVABLE, FLUID-COOLED TARGET
Lawrence E. Brown, Palo Alto, and Phillip T. Jones, Los Altos, Calif., assignors to Varian Associates, Palo Alto, Calif., a corporation of California
Filed May 28, 1962, Ser. No. 198,212
3 Claims. (Cl. 313—60)

ABSTRACT OF THE DISCLOSURE

X-ray apparatus of an improved type is realized by incorporating a movable X-ray target supported on a movable shaft with the shaft protruding through a wall in the accelerator means and movable relative to the accelerator means with provisions for fluid cooling of the target via the shaft. Improved X-ray apparatus target assemblies incorporating hollow tubes protruding through vacuum walls of the apparatus and provided with ductile thimble sealing means in conjunction with fluid cooled targets. Fluted thimbles provide additional advantages.

CROSS REFERENCES TO RELATED APPLICATIONS

Divisional applications of the subject application are: U.S. patent application Ser. No. 574,863 by L. T. Brown and P. T. Jones filed July 5, 1966, U.S. patent application Ser. No. 590,118 by L. T. Brown and P. T. Jones filed Aug. 18, 1966 and U.S. patent application Ser No. 600,282 by L. T. Brown and P. T. Jones filed Aug. 25, 1966, as well as others, all of which are assigned to the same assignee as the present invention. Said divisional applications are directed to and claim the patentable disclosed but unclaimed subject matter of this application.

This invention relates in general to an apparatus for producing high energy radiation and, in particular, to an apparatus employing a high energy charged particle beam to bombard a target for converting beam energy into high energy X-rays, useful, for example, in radiographic applications such as X-ray inspection of ballistic missile rocket motors and the like.

A point X-ray source is desirable when X-ray photographs are to be taken, so that maximum picture resolution is obtained. A point source of high intensity X-rays is advantageously obtained by intercepting a high energy electron beam on an X-ray target in such a manner as to produce a small beam spot, i.e. a small instantaneous area of beam interception. A small beam spot of high intensity, high energy particles, bombarding a target, produces problems such as overheating of the target and, if the beam is pulsed, fatiguing of the target material as the target is subjected to repeated thermal stresses formed between the heated localized area and the cool surrounding area.

The target overheating problem could be solved by providing a high thermal conductance path from the target to a heat sink. A moving target would reduce the total number of stress repetitions for a given target volume and assist effective thermal conduction by distributing the beam energy and beam spot repetitions over a larger target volume. However, when a moving X-ray target and a beam are disposed in a relatively high vacuum, so that a sharply focused beam is produced for obtaining a small beam spot, there are severe problems encountered in providing such a high thermal conductance path to a heat sink as the path must pass through the vacuum envelope and target motion must also be transmitted through the vacuum envelope.

Heretofore in an X-ray machine an electron beam was accelerated along a straight axis by an R.F. linear accelerator, and then allowed to strike a target, producing X-rays that were aligned with the axis. The flexibility of the X-ray machine was substantially limited because the axis had to be pointed at the object to be X-rayed and room for swinging the relatively long machine about the object is needed. Also, the X-ray spot size was inherently large due to the relatively large aperture in the accelerating structure, the divergence of charged particles due to space charge spreading, and the injection characteristics of the charged particles into the accelerator.

In the present invention, the linear accelerator is mounted so that it rotates about an axis that is normal to the beam axis. The charged beam travels through a magnetic beam optic system, whereby the beam is deflected approximately 90° from the accelerator axis before it is sharply focused at a given stationary position, where it strikes a target. The magnetic optic system is designed to cause the beam to focus to a very small fraction of its original size, forming a small spot X-ray energy lobe in the form of a small cone, that is disposed 90° to the accelerator axis. The X-ray beam is rotatable about the accelerator axis, allowing the X-ray cone to be readily pointed in any direction. The target is preferably in motion and force cooled by efficiently transmitting the thermal energy to a heat sink located outside the vacuum vessel.

The motion of the target is controlled from outside the vacuum wall, without impairing the high vacuum, therefore the beam is not scattered due to ion bombardment. As the beam is being bent, preferably the lower energy particles are removed from the beam in a region out of "view" of the X-ray film, since the relative sharpness of focus is inversely related to the particle energy spread of the beam, thereby reducing the effective X-ray source size. The X-ray source size is further reduced or controlled, as desired, by controlling the portion of the beam cross section intercepted by the target, by moving the target into or out of, the focused beam and/or by moving the beam relative to the target.

A principal object of this invention is to provide an improved X-ray apparatus, wherein high energy, high intensity X-rays are formed by particle bombardment of a target, and such X-rays are useful for example, for producing X-ray pictures with improved resolution and sharpness.

Another feature of this invention is the provision of a fluid-cooled solid-target mounted on a target support that extends through a vacuum wall via the intermediary of a movable vacuum-tight seal between the support and vacuum wall whereby the support, and in turn the target, are movable with respect to the wall and to the beam while allowing cooling fluid to pass through the support to efficiently cool the target.

Another feature of the present invention is the provision of a refractory, heavy-element, annular X-ray target with a coefficient of thermal expansion lower than that of a ductile and good-heat-conductor, cooled, metal support surrounded by the target in bonding relationship, whereby the thermal energy could readily flow from the annular target to the ductile metal support and the target does not melt due to any temperature gradient within the structure. The interior of the cooled target support, preferably includes a fluid coolant channel which is preferably fluted to increase the wetted-surface, cooling-area, and rate of cooling.

These and other features and advantages of the present invention will be more apparent after a perusal of the following specification taken in connection with the accompanying drawings wherein:

FIG. 2 is a reduced top view of the target head taken on line 2—2 of FIG. 1,

Figure 1:
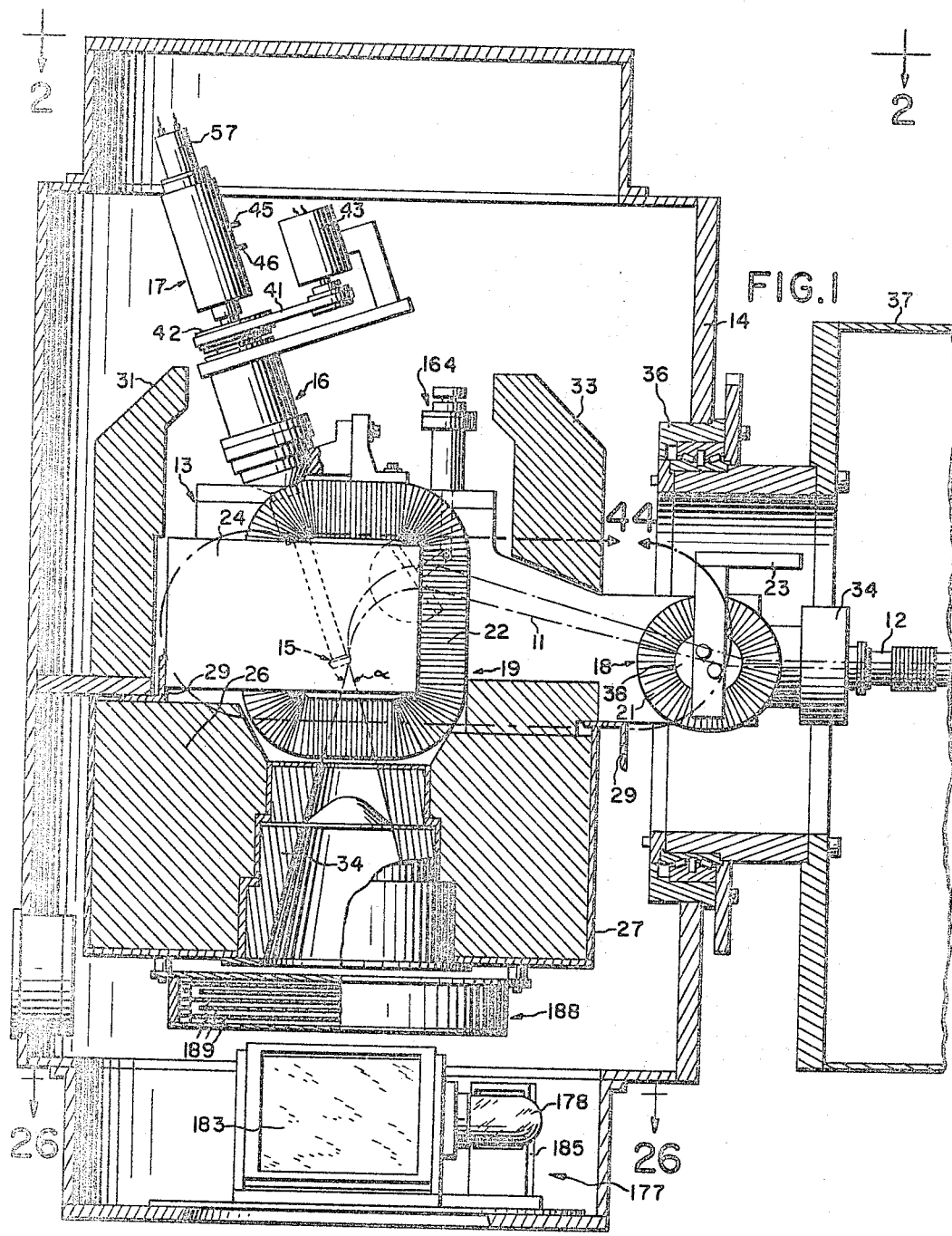
FIG. 1 is a partially broken away view of the target head of an X-ray machine.

FIG. 3 is an enlarged sectional view of a portion of the target head taken on line 3—3 of FIG. 2, FIG. 4 is an enlarged longitudinal cross sectional view of another portion of the target head delineated by oval line 4—4 of FIG. 1, FIG. 3 is an enlarged sectional view of the portion of the target enclosed by line 5—5 in FIG. 3, FIG. 6 is a section of the target taken on line 6—6 of FIG. 5, FIG. 7 is an alternate embodiment of the rotating vacuum-tight seal enclosed by circle 7—7 of FIG. 3, FIG. 8 is still another alternate embodiment of the rotating vacuum-tight seal, FIG. 9 is an enlarged portion of another embodiment of the vacuum-tight seal enclosed by circle 9—9 of FIG. 3, FIGS. 10, 11 and 12 are still other embodiments of the vacuum-tight seal, FIG. 13 is an enlarged cross-section of a portion of the target head taken on line 13—13 of FIG. 3, FIGS. 14, 15 and 16 are enlarged views of the beam bombarding a target in three special conditions to form X-rays, FIG. 17 is a graph of the X-ray photon flex density at about 90° to the accelerator axis versus beam target overlap, FIG. 18 is another embodiment of the target wherein the target is a stream of fluid, FIG. 19 is another embodiment of the target wherein a fluid target is enclosed within a tube, FIG. 20 is another embodiment of a rotating target, radiantly cooled by a cold wall, FIG. 21-a is another embodiment of the target utilizing a cold wall for radiant cooling of the target and the target is rotated by eddy currents, FIGS. 21-b and 21-c are alternate embodiments by which the target ring of FIG. 21-a intercepts the beam, FIG. 22 is another embodiment of a movable target, FIG. 23 is another embodiment of a rotatable target, FIG. 24 is a schematic diagram of the optics for pre-aligning the X-ray machine, FIG. 25 is a view taken along line 25—25 of FIG. 24 in the direction of the arrows, and FIG. 26 is a reduced-size view taken along line 26—26 of FIG. 1 in the direction of the arrows.

Referring now to FIG. 1, the features of this invention will be described as incorporated on an X-ray machine. Briefly the X-ray machine has a means for forming a high-energy as, for example, 10 mev. or higher, and as low as 200 kev., charged-particle beam of a high average current, for example 20 microamps. A typical high energy beam producing device is, for example, a linear accelerator (not shown) that produces an electron beam 11 (delineated by long and short dash lines) within an evacuated tube 12. The beam 11 enters an evacuated centrally disposed target head chamber 13 enclosed by a suitable housing 14 where the beam is preferably bent approximately 90° before it bombards a suitable target assembly 15 to form X-rays. The target assembly 15 is supported by a suitable housing support means 16 and is cooled by a suitable cooling means which in this embodiment is a fluid coolant manifold 17.

The beam is bent by two electromagnet assemblies 18 and 19 which have electromagnet coils 21 and 22 and have iron yokes 23 and 24 respectively. The first magnet assembly 18 first bends the beam upwardly (as observed on the drawing) from its initial path (the axis of tube 12) and magnet assembly 19 bends the beam back toward the axis in a downwardly direction. This arrangement of magnetic fields not only provides for an X-ray machine that is versatile but provides simplified electron optics for focusing the beam to a small spot.

The location of the beam focal spot within the chamber 13 is primarily determined by the ratio of magnetic field intensity of the two magnets 18 and 19. Once the location of the focal spot is determined, the ratio is preferably fixed so that energy variations in the electron beam or fluctuations in the magnets' current are continuously self-compensated and the focal spot remains fixed. This ratio is maintained by connecting coils 21 and 22 in series to a DC power supply.

The evacuated target chamber 13 is preferably enclosed in a lead shield to shield all extraneous and unwanted X-rays that would interfere with the picture resolution. The lead shield includes a lead ring 26 that is supported by a steel cup-shaped structure 27 which in turn is carried within the outer housing 14 by two transversely directed angle brackets 29 welded across the housing 14, as shown in FIG. 2. Additional shielding in the form of lead blocks 31 and 33 are also suitably held in place within housing 14.

The X-ray photon flux density emanating from the target point source will be found to be heavily directed into a lobe formed in the direction of the impringing beam particles. The X-ray lobe is then collimated as desired by an apertured lead collimator 34 having a cone angle $\alpha$ as of 30°.

The outer housing 14 with its internal electron and X-ray optics is rotatable about the axis of accelerator tube 12. Therefore the machine includes a suitable rotatable vacuum-tight seal 34 in the vacuum envelope joint between the fixed accelerator tube 12 and the rotatable evacuated target head chamber 13 and in addition includes a bearing assembly 36 between the rotatable outer housing 14 and the fixed casing 37 enveloping the accelerator 12.

Beam bombardment of the target 15 produces, at the beam spot, a minute target volume of extremely high instantaneous temperature. Rotation of the target 15 substitutes succesively different target volumes to the beam spot thereby allowing the previous beam spots to cool, preventing melting of the target and also reduces the number of thermal stress repetitions of a given minute volume for a given time. Referring to FIG. 3, one target embodiment is shown. The rotating target 15 is supported on one end of a tubular shaft 38 that extends through an apertured cover plate 39 for chamber 13 and through the support structure 16 to terminate in the fluid coolant manifold 17. The shaft 38 is mounted within the encircling support structure 16 by a pair of axially spaced bearings 40 so that the shaft 38 rotates with respect to the support 16. Power to rotate the shaft 38 is supplied by a belt 41 to a pulley 42 keyed to the shaft 38. The belt 41 in turn engages an electric motor 43 (FIG. 1) carried from the support structure 16. Cooling water cools the target and the manifold 17 provides a means for effectively transferring water into and out of the rotating shaft 38.

The fluid coolant target manifold 17 has an outer tubular member 44 with two axially spaced fluid fittings 45 and 46 forming an inlet and outlet. Since stationary fluid lines (not shown) connect to the fittings 45 and 46, member 44 is held stationary. Then within tubular member 44 in coaxial bearing relation is a thimble 47 having an internal well 48 with an internal threaded rim which is affixed over the threaded end of shaft 38. A tube 49 is carried coaxially within shaft 38 and thimble 47. The upper end of tube 49 is sealed to the thimble well 48. Thimble 47 has two sets of radial ports 51 and 52 axially spaced apart, one set 51 communicating with the interior of the central tube 49 via well 48 and the other set 52 communicating with the annular spaces between shaft 38 and tube 49.

Three rotating liquid-tight seals 53 are disposed axially spaced apart from each other and between the thimble 47 and the stationary outer tube 44 so that fluid fitting 45 communicates only with radial ports 51 and fitting 46 communicates only with radial ports 52.

Each of the liquid-tight seals 53, within the fluid cooling manifold 17, is formed by two mating sliding surfaces on ring members 54 and 55 suitably sealed by suitable "O-ring" gaskets to the rotating thimble 47 and to the member 44, respectively. Fluid coolant, as of water, flows down the inner tube 49 and returns after cooling the target 15 by the annular passageway defined by the space between coaxial tube 49 and shaft 38. The specific features of the target 15 whereby cooling is enhanced will be described hereinafter.

A safety interlocking device prevents power from being supplied to the accelerator and prevents the formation of a beam if the target 15 is not rotating or is not rotating above a minimum speed. This safety feature is, for example, in the form of a small DC generator 57 mounted on the coolant manifold 17 and coupled by a shaft to thimble 47 and rotatable shaft 38. A direct current voltage is generated by the generator 57 having an amplitude in proportion to the rotational speed of the target. When the output voltage is above a minimum value the power to the accelerator is free to go on. This minimum value could be readily determined by one skilled in the art since the target should have sufficient velocity to prevent high instantaneous temperatures over the spot size. For short pulse-length accelerators the velocity of the target should be sufficient to allow the previous target beam spot to move substantially out of the way of the next beam pulse. A rotational target speed, for example, as low as 150 revolutions per minutes is sufficient to prevent target melting or fatigue for a ring target of mean diameter of .600 inch, using a beam pulse repetition rate of 500 pulses per second, average current of 20 micro-amps, and electron particle energies of 10 mev.

An alternative target embodiment of the present invention is shown in FIG. 18 where like numerals refer to substantially similar items as above. The electron beam 11 is intercepted by a jet target 58 formed by a liquid having a low vapor pressure, for example, mercury. A pump 59 recirculates the mercury out of the vacuum chamber, through a suitable tube 61 wherein the fluid is conveniently cooled before it is again jetted into the beam. The tube 61 protrudes through a wall of chamber 13 and has a suitable nozzle 62 enclosed within the vacuum chamber.

FIG. 19 shows an alternative target embodiment wherein the fluid target of FIG. 18 is enclosed in a tube 63 of, for example, molybdenum. The beam 11 bombards the same spot on the tube 63, but there is a different volume of the flowing target-fluid to be bombarded with each successive beam pulse. In this embodiment the characteristic of the fluid need not be limited to having a low vapor pressure as the fluid of FIG. 18. Of course, the total thickness of tube and fluid in the direction of beam travel should correspond to the electron penetration depth into the particular materials used.

Referring to FIG. 20, there is shown an alternative target embodiment of the present invention. The beam 11 strikes a disk target 64 rotating on a shaft 65. Heat is continuously radiated from the target, the radiation rate is increased by providing a cold-wall heat-sink 66 disposed very close, as of .015–.020 inch from the target. This is accomplished by enveloping a portion of the rotating target 64 with a slot 67 formed in the cold-wall heat-sink 66. The target 64 is closely spaced on three sides to the cold-wall which could be at room temperature, 75° F., or which could be force cooled by suitable refrigerant to an operating temperature of, for example, −150° F. to enhance the absorption of heat. The heat-sink 66 could be a vacuum wall of chamber 13 so that heat is conducted to a place outside the vacuum.

The embodiment in FIG. 21–a incorporates the radiant cooling feature as shown in FIG. 20 for a ring target 68. But in this embodiment the ring target 68 floats preferably between two slots 69 and 71 (to increase the absorption of heat) formed in two AC magnet poles 72 and 73, respectively. The ring 68 is rotated by eddy currents formed therein as the AC magnetic field is reversing between the two poles 72 and 73. The ring target could be so arranged that the beam 11 would strike the ring in an axially parallel direction as shown in FIG. 21–b or in a radial direction as shown in FIG. 21–c. One skilled in the art could shape a rotating magnetic field to cause the ring 68 to float between the poles 72 and 73.

FIG. 22 shows an alternative embodiment for providing target motion. A target paddle 74 is disposed at the end of a rod 76. The rod 76 extends through an aperture 77 formed in the vacuum wall of chamber 13. A metal bellows 78 is sealed to the side wall of aperture 77 and the rod 76 thereby forming a flexible vacuum-tight seal therebetween. As the beam 11 bombards the target 74, motion is transmitted to the target from outside the vacuum system, for example, by coupling the exterior end of rod 76 to an eccentric (not shown). Cooling of the target 74 could be preferably provided by following a cooling fluid axially through the rod 76 in a similar manner as cooling fluid flows in shaft 38 (FIG. 3).

Referring now to FIG. 5 the rotating target assembly 15 is shown in detail. A short inverted frustro-conical target ring 79 as of tungsten is coaxially mounted on a dissimilar metal, for example a ductile, good-conductor, beveled, metal sleeve 81 as of gold. The sleeve is in turn coaxially mounted on an inner thimble 82 as of stainless steel so that in case the target 79 and sleeve 81 melt, crack, or fall off, the vacuum is saved. The thimble 82 is carried from the inner end of shaft 38 so that its internally disposed tube 49 extends into a well formed in one end of the thimble 82. Coolant as of water, for example, from tube 49 enters the well near the bottom and rapidly flows upward therein, thereby preventing formation of any pockets of still water that could readily turn to steam and form an insulating film. Axially parallel flutes 83 are formed on the interior walls of thimble 82 to increase the wetted surface area so that more heat transfer area is provided and the "skin layer" insulation film effect of the water is reduced. The thimble 82 is formed of one piece of material with no seams again to reduce the possibility of cracks forming due to thermal cycling.

The interface between thimble 82 and sleeve 81 is preferably in tight contacting relation for maximum heat transfer. The assembly of these parts is obtained by cooling thimble 82 to a lower temperature than the outer sleeve 81 and slipping the cool thimble 82 into sleeve 81 and when the two equalize to the same temperature they are tightly gripped together. The target ring 79 is then pressed tightly over the beveled portion of sleeve 82 and the whole subassembly including thimble 82, sleeve 81 and target ring 79 are securely affixed together as for example by brazing. The refractory X-ray target ring 79 is preferably tungsten and the beveled sleeve 81 is preferably of a ductile metal, for example, gold, silver, or copper, with a higher thermal coefficient of expansion and thermal conductivity, than the target ring 79, to increase the heat transfer rate across the interface for enhanced cooling effect and for minimizing thermal fatigue at or near the interface of the target ring 79 and sleeve 81. As an alternative, the subassembly of members 79 and 81 or 79, 81 and 82 could be formed of gold or tungsten.

The length L of an element of the target ring 79 is essentially made equal to the distance an average energy beam electron penetrates the target material while the width W as, for example, one millimeter, should be at least equal to the diameter of the focused beam spot for reasons to be hereinafter explained.

Referring to FIG. 23, an alternative target embodiment is shown wherein two target assemblies 15 are incorporated so that each assembly is only required to remove half the heat from the beam and therefore the cooling capacity is doubled for the same size rotating target assemblies. The summation length L of the elements of both ring targets 79′ is essentially made equal to the distance L in FIG. 5, whereby an electron delivers substantially half its power to one assembly 15 and the other half to the other assembly 15.

Rotating the target, in a preferred embodiment, entails the use of a durable vacuum-tight rotatable seal between the rotating shaft 38, which supports the target 15, and the fixed wall of the vacuum chamber 13. Referring to FIG. 3, one embodiment of the rotating vacuum-tight seal assembly 84 is shown. The vacuum seal assembly 84 is formed by two mating sliding surfaces, one forming a stator and the other forming a rotator. The stator is formed by a flat annular surface 86 formed on an annular support adaptor 16', carried from the cover plate 39.

The rotator is a flat annular surface formed on a ring 87 carried from the rotating shaft 38 via the intermediary of a metal bellows 88 and annular flange 89. The metal bellows 88 is under slight axial compression to provide a slight spring bias holding the rotator and stator sliding surfaces together at their mating interface and the bellows further accommodates slight axial misalignments between the parts thereby preventing rocking between the mating sealing surfaces.

The mating interfaces of the rotating seal 84 are subdivided into two radially spaced apart pairs of interfaces by the provision of an annular groove 90. A low pressure or "guard vacuum" of approximately $10^{-2}$ mm. Hg is pulled on groove 90 through passageways 91 in the annular adaptor 16' and communicating passageway 92 in part 16". The guard vacuum greatly reduces the net leak rate through the rotating seal since the leak rate is proportional to the pressure differential across the leak and inversely proportional to the length of the leak. Therefore the guard vacuum reduces the leak rate by approximately a factor of $10^{-5}$ when going from atmosphere pressure to high vacuum of $10^{-6}$ or $10^{-7}$ mm. Hg. A suitable vacuum-tight gasket 93 having passageways 94 is placed between parts 16' and 16" with passageway 94 communicating with passageways 91 and 92.

The mating interface surfaces of the rotating seal 84 are preferably optically flat and should have as low a coefficient of friction as possible to minimize wear. The mating surfaces are preferably made of dissimilar materials that inherently have a low coefficient of silding friction when the two dry surfaces rub each other. Typical materials for this application are carbon sliding on stainless steel or molybdenum disulfide sliding on metal.

An alternative rotating vacuum-tight seal embodiment of the present invention is shown in FIG. 9. This embodiment is similar to the embodiment of FIG. 3 except that the "stator" is formed by a floating ring 96. Floating stator ring 96 has two flat end surfaces 97 and 98, one flat end surface 97 making sliding contact with the fixed surface 86 of the vacuum envelope 16' and the other flat end surface making sliding contact with a surface on a rotator ring 99. Rotator ring 99 is suitably attached to one end of bellows 88 which in turn is carried via flange 89 from rotating shaft 38. An annular groove is formed in each end surface 97 and 98 of the floating stator ring 96 and a port 102 communicates between the two grooves. A guard vacuum is pulled on passageway 91, thereby forming a vacuum in both annular grooves in floating stator ring 96. A retaining ring 103, keyed in place to the vacuum envelope, surrounds the floating ring 96 and maintains floating stator ring 96 coaxial with the rotating shaft 38. This embodiment has the advantage that the floating stator ring 96 need not be attached in a vacuum tight manner to the vacuum envelope. Such attaching operations, as brazing sometimes leads to distortion of the stator flat sealing surfaces causing leaks.

Another alternative embodiment of the rotating vacuum seal assembly 84 is shown in FIG. 10. In this embodiment a radially directed rotator metal collar 104 is bonded by brazing, soldering, or gluing to shaft 38. The rotator collar 104 has two flat axially spaced apart, end surfaces 105 and 106. A pair of stator rings 107 and 108, respectively abut the rotator collar 104 from opposite ends to form a separate pair of sealing interfaces. The stator rings 107 and 108 are urged against the end surfaces 105 and 106 of rotator ring 104 by a pair of metal spring bellows 109 and 110 bonded in a vacuum tight manner to a stationary part of the vacuum envelope formed by support structure. A guard vacuum is drawn on the space between the pair of sealing interfaces through a port 111. The collar 104 preferably has a circumferential groove 112, whereby the stresses set up by the bonding processes are prevented from marring the trueness of the rotator end surfaces 105 and 106. This embodiment has the advantage over the seal structure of FIGS. 3 and 9 in that the two stator sealing surfaces are mechanically isolated from each other such that uneven wear in the parts at the interfaces does not produce rocking of the interface, which could lead to excessive leak rates.

FIG. 11 illustrates an alternative embodiment substantially similar to the embodiment of FIG. 10 wherein the stator surfaces 105' and 106' are formed on parts of the stationary target support structure 16 of the vacuum envelope. The rotator rings 107' and 108' are carried from the rotating collar 104' by metal belows 109 and 110. The rotator rings and bellows rotate with shaft 38 instead of being stationary as in FIG. 10. The guard vacuum is again drawn through the port 111.

Still another rotating vacuum seal embodiment is shown in FIG. 12. In this embodiment two coaxial axially coextensive bellows 88' and 88" are carried at one end by the rotating shaft 38 via flange 89. A pair of radially spaced rotator rings 113 and 114 are bonded to the other ends of the bellows 88' and 88". Rotator rings 113 and 114 bear against the fixed stator surface 86 of the vacuum envelope portion of the target support structure 16'. A guard vacuum is drawn, like in FIG. 3, through passageways 91 in the support structure 16' forming a vacuum between the coaxial bellows 88' and 88". This embodiment like the previous embodiment of FIGS. 10 and 11, provides a degree of mechanical isolation between the spaced sealing interface elements. A variation of this embodiment (not shown) is to form the rotator surface on a collar mounted on tube 38, similar to either rotator surfaces 105 or 106 on collar 104 of FIG. 10. In this variation both coaxial bellows 88' and 88" are a part of the stator assembly vacuum sealed to the envelope and a guard vacuum passageway 91 communicates with the space between the bellows. The bellows also carry the radially spaced stator rings from the ends of the bellows.

Another rotating vacuum seal embodiment is shown in FIG. 7. In this embodiment, the spring bias force for urging the sealing interface together is provided by a separate spring rather than relying upon the spring action of a compressed metal bellows. Also the metal bellows have been replaced by rubber bellows. More specifically, a pair of axially spaced apart rotator rings 116 and 116' are carried from the rotating shaft 38 via the intermediary of flexible bellows 117 and 117' and flanges 118 and 118'. The rotator rings 116 and 116' slide on flat surfaces formed on mating stator rings 119 and 119', and are carried from the wall of vacuum envelope portion of the target support structure 16. The rotator and stator rings are urged together by a pair of separate compression springs 121 and 121' carried under slight compression inbetween the rotating shaft flanges 118 and 118' and the rotator rings 116 and 116', externally of, and axially coextensively with, the rubber bellows 117 and 117'. Suitable "O-ring" gaskets are placed as needed between the parts.

A guard vacuum is pulled on the space between the pair of axially spaced rotating seals by means of an evacuation port 122 and interconnecting passageway 123.

Referring to FIG. 8, there is shown a variation of the rotating vacuum seal 84 of FIG. 7. In this embodiment the springs 121 and 121' and bellows 117 and 117' of FIG. 7 have been replaced by coaxial ring members made of a magnetic material. The rotator and stator surfaces are urged together by means of magnetic attraction. More specifically, a pair of rotator ring shaped magnetic members 132 and 132' of ferro-magnetic material are sealed to the rotating shaft 38 at axially spaced positions by suitable gaskets. A pair of rotator rings 133 and 133′, as of carbon, are bonded to the ends of the rings 132 and 132′. The rotator rings 133 and 133′ slidably abut a pair of axially spaced magnetized steel stator rings 134 and 134′ for forming the spaced rotating vacuum seals. A guard vacuum is drawn on the space between the rotating seals in the manner as shown in FIG. 7. One advantage of this embodiment is the elimination of the relatively fragile bellows, but at a slight sacrifice in ability to tolerate axial misalignments of the elements.

Control of the size of the point X-ray source is obtained by intercepting more or less of the focused beam cross section on the target 15. This control is effected by either moving the beam into the target and/or moving the target into the beam. In the embodiment of FIG. 3, the target 15 is mechanically moveable relative to an assumed fixed beam path. Two separate mechanical adjustments as in FIG. 3 and FIG. 7 or FIG. 8, are provided for producing movement of the target into the beam path. An electrical means for moving the beam into the target will be described after the two mechanical adjustments are described.

In a first mechanical control of the beam spot (FIG. 3) size the target is moved relative to the beam trajectory by translating the entire elongated target assembly separately in both the horizontal and vertical directions by means of adjusting the position of the target support structure 16 relative to the vacuum envelope structure 13.

The flexible portion means between the vacuum envelope 13 and support structure 16, is provided for example, by a metal bellows 135. The bellows 135 permit adjustment of the target position within the envelope 13.

Two L-shaped brackets 136 and 137 support the target assembly via adaptor plate 16″ from the cover plate 39. The first L-bracket 136 is bolted to the cover plate 39 via a bolt 138. The bolt hole in the bracket 136 is enlarged to permit horizontal adjustment of its position and consequent horizontal adjustment of the dependent supported target assembly. Similarly the second L-shaped bracket 137 is bolted to the first L-shaped bracket via bolt 139 passing through an enlarged opening in the first bracket 136 to allow vertical adjustment of the position of the second bracket with respect to the cover plate 39 and consequent vertical adjustment of the dependent target assembly.

The other mechanical adjustment of target position is shown in FIGS. 7 and 8. In this structure the target is axially adjustable within evacuated chamber 13. An inverted doubled, walled, rotatable cup member 140 is coaxially mounted on the rotating target support shaft 38 and coupled to the tube 38 via bearing assembly 40 for transmitting axial translation of the cup 140 to the rotating target support tube 38. A second cup 141 is stationary and vacuum sealed at its bottom to the vacuum envelope 13 via bellows 135. The side walls of the second cup 141 are coaxially disposed inbetween the double walls of the first rotatable cup 140. External threads at the lip of the stationary cup threadably mate with interval threads on the outer wall of the first rotatable cup 140.

Rotation of the first cup 140 causes the first cup to travel axially of the stationary cup 141 and in consequence, the target is axially translated into and out of the beam trajectory to vary the size of the target intercepted cross sectional area of the beam thereby varing the size of the point X-ray source.

A pair of axially spaced "O-rings" 142 are disposed inbetween the exterior surface of the inner wall of the first double walled cup 140 and the inner surface of the side wall of the stationary cup 141 for providing a rotatable vacuum seal. A guard vacuum is pulled on the space between the two "O-rings" 142 via an annular passageway 122.

Cups 140 and 141 are selectively locked in position as desired to present inadvertent axial target translation. A steel locking ball 143 is carried in a radially directed passageway in the outer wall of the rotatable cup 140 and is wedged against the side wall of the stationary cup 141 by means of a pointed screw 144, axially translatable of the rotatable cup 140 in a threaded bore thereof.

The electrical method and apparatus for controlling the X-ray source spot size is best described with regard to FIGS. 4, 14, 15, 16, and 17. The electron beam optics of the X-ray head (FIG. 4) use a double deflection technique. More specifically, the beam 11 successively transverses a first and second space displaced transverse magnetic field. The fields are oppositely directed in the spaced gaps such that the beam is first deflected in one direction and subsequently deflected in the opposite direction onto the X-ray target 15. This double deflection technique permits focusing of the beam to a small spot size in spite of a relatively wide spread in particle velocities as of ±6%, as found in the beam of a velocity modulated rf linear accelerator.

Control of the focal point in the horizontal plane is obtained by changing the magnetic deflecting field intensity in one of the deflecting gaps relative to the other. In a preferred embodiment, a trim coil, not shown, is wound on the pole structure of the first deflecting magnet 18 (FIG. 1). A variably controllable electrical current is passed through the trim coil. Increasing the magnetic field in the first gap relative to the second gap as by means of the trim coil, causes the focal point of the beam to move to the right as observed in FIG. 4. Decreasing the magnetic field in the first gap relative to the second gap causes the focal point to move to the left.

A method for obtaining an optimally small X-ray point source is depicted in FIGS. 14–17. In FIG. 17 there is shown a plot of X-ray photon flux density coming from the point source when measured at some fixed point out in space in line with the axis of the cone of collimator 34, as a function of the degree of overlap between the beam and target. For example, D, D′ and D″ depict the X-ray point source size for the degrees of beam target overlap depicted in FIGS. 14–16 respectively, also points D, D′ and D″ in FIG. 17 correspond to the relative beam positions depicted in FIGS. 14–16 respectively. If only a portion of the beam is intercepted, the point X-ray source size is small and the X-ray photon flux intensity is reduced due to non-interception of a portion of the beam. Also if the target is moved too far into the beam, as shown in FIG. 16, part of the beam will be intercepted by a very thick portion of the effective target resulting in some of the X-rays being absorbed by the excessive target thickness L′. In addition to this, the intensity of X-rays on the right side portion of the X-ray lobe will be increased due to a lesser angle of beam target interception. Since FIG. 17 shows flux density taken at a point on the collimator axis 34, the right portion of curve (at about D″) will drop faster than would a curve taken of the gross X-ray flux being emitted by machine.

An optimally small X-ray source size corresponds to point "0" on the curve in FIG. 17 where slightly less than the entire beam cross section is intercepted by the target ring 79. Operation at point "0" is easily obtained by monitoring X-ray photon flux intensity in axial alignment with the collimator 34 or radiated from the target while increasing the degree of beam interception from a low value toward full interception. From a position of full interception the degree of interception is slightly reduced for operation at point "0."

Referring to FIG. 4, there is shown another embodiment of the present invention, more particularly, a preferred electron optic design for an X-ray generator is shown. The electron optical system of the X-ray generator is characterized by having the electron beam path bend through a net angle of 90°, followed by a sharp focus of the electrons onto the X-ray target. The net 90° bend in the beam path is provided to produce an X-ray machine with greater mobility, and in so doing, a system of electron optics is developed whereby electrons with an energy spread of as much as ±6% are sharply focused with minimized aberration in the focused beam.

The electron beam 11, after it is accelerated to high energies, transverses a transversely directed magnetic field formed between a pair of pole pieces 146 (only one pole is shown) produced by magnet assembly 18 for deflection of the beam. The mean beam trajectory is deflected from the original accelerator beam axis by preferably a shallow angle, such as, for example, 15°. The angle of deflection for any one particle of the beam is related to its energy such that the slower the electrons, the greater is the angle by which they are deflected. Therefore the energy spread of the beam is thereby transformed via the deflection, into a related angular spread of beam trajectories. Now particles with certain predetermined energy levels may be selected by accepting only certain trajectories and rejecting all others. Accordingly a collimating bore 149 is arranged in axial alignment with the mean energy ray axis of the beam. The transverse dimension of the bore 149 in the direction of beam spreading, determines the energy spread accepted. In the preferred beam optical design the selected energy spread is ±6%, as determined by a bore 149 of diameter about ¾ inches and length about 7 inches. The length of the collimating bore 149, i.e. the distance between its beam input port and beam output port is preferably made long to provide a large area on which to collect undesirable electrons, thereby preventing localized heating.

The collimated beam next traverses another transversely directed magnetic field gap, formed by magnetic assembly 19 between pole pieces 151 and 152. Since the electron trajectories are angularly arrayed in the plane of beam deflection and are spread according to energy levels, the magnetic field focuses the beam in the plane of the deflected beam (in the plane of the drawing as observed in FIG. 4) and hereinafter called horizontal and energy focus. The energy spread of electrons are focused because the lower energy electrons following a path having a greater curvature than the higher energy electrons and the curve paths of the various energy level electrons inherently cross at substantially the same point. The beam is focused in the plane normal to the plane of the deflected beam (normal to the paper) hereinafter called vertical focusing, because of the effects of the inclined fringe fields at the beam entrance edge 153 of the magnetic field. At the inclined entrance edge 153, of the second beam focus magnet 19, the fringe field contains a component in the plane of the deflected beam, and said component being normal to the beam path. This normal field component produces focusing of the beam in the plane normal to the plane by beam deflection according to the principle taught more precisely in U.S. patent application 798,064, filed on Mar. 9, 1959. The strength of the vertical focusing is determined by the angle (less than 90°) the beam path makes with the inclined edge 153 of the magnet, the smaller this angle is the greater would be the vertical focusing. Therefore edge 153 is disposed on two rotatable pole sections 151' and 152' that are arranged to rotate about point A. (Pole section 151' is more clearly shown in FIG. 3.)

The uniformity and strength of the magnetic field between the poles determines the place of energy focus since the radius of curvature of the beam path in a uniform magnetic field is directly related to the magnetic field strength. Since the energy of the electrons is relatively high a strong magnetic field as of about 8000 gauss is used to bend the beam within a reasonable space limitation and the magnetic field is preferably uniform. A strong magnetic field is produced by making the air gap as small as practicable as of 0.64 inch in a preferred embodiment (see FIG. 13) the pole pieces 151, 152 are placed within the vacuum chamber 13, thereby minimizing the reluctance of the magnetic circuit, obtaining a maximum uniform field intensity for a given magnet size, and reducing the amount of fringing field.

Another advantage of placing the pole pieces within the vacuum chamber is that a vacuum tight seal is eliminated between the large magnet yoke and the vacuum chamber as encountered when the magnet yoke, of the electro-magnet, is made to protrude through the vacuum wall.

Although the place of vertical focus and the place of focus in the plane of beam bending are both changed by changes in the beam entrance angle into the rotatable pole face section, a very good compromising focus is obtainable.

Vacuum wall portions 154 and 155 disposed adjacent the pole pieces 151 and 152 are made as thin as practicable, since they are disposed directly in the path of the magnetic circuit. Pole pieces 151 and 152 serve the additional function of reinforcing the thin vacuum wall portions 154 and 155. The internal pole pieces 151 and 152 are mechanically supported at their top portions within chamber 13 and from cover 39 (FIG. 3) through the intermediary of a suitable block 157 made for example, of aluminum. In addition (FIG. 4) aluminum spacer plugs 158 and 159 are suitably disposed between poles 151 and 152 and secured, for example, by screws 161 to maintain the gap spacing between the poles 151 and 152. The plugs 158 and 159 are spaced in such a manner that they are not in the undeflected beam path when the electro-magnets 18 and 19 are de-energized and consequently the beam 11 could pass through an axially aligned bore 162 to a target.

Vertical, horizontal, and energy focus is obtained, as previously described, by rotating pole sections 151' and 152'. Mechanical motion to rotate the pole sections 151' and 152' is transmitted through the vacuum wall by suitable apparatus 164 (FIG. 3). The apparatus 164 includes a worm shaft 166 operating into a rotationally constrained nut 165, a vacuum tight bellows 167 seals the nut 165 to the vacuum housing 13 and rod 168 carried from the nut is pinned to a pair of arms 169 protruding from a square frame 171 to which is bolted rotatable pole sections 151' and 152'.

Both fixed pole pieces 146 (FIG. 4) for magnet assembly 18 are also disposed within the vacuum vessel 13 in the same manner as pole pieces 151 and 152 but pole pieces 146 are supported at their bottom ends from a suitable cover plate 172 welded in place to the vacuum vessel 13.

Some of the high energy particles, as pointed out above with regard to obtaining an optimumally small point X-ray source, would miss the target. These nonintercepted particles or electrons remain in the magnetic field and are bent approximately a total of 180° to their original accelerator trajectories and are collected on a wall 173. Any X-rays that are formed on wall 173 are first formed in a lobe directed at right angles to the desired lobe and secondly are shielded from the object to be X-rayed. Since high energy electrons are dissipating their energy into the wall 173, suitable ducts 174 are formed in the wall of vessel 13 and have coursing there through a suitable fluid coolant as of water.

Relativistic electrons, i.e. energies greater than 1 mev., produce directional forward scattering of X-rays thereby producing a forward directed lobe of X-ray photon intensity. Due to the formation of directional X-ray lobe it is desired to pre-align the lobe with the target to ensure that the high energy X-ray photons are penetrating the correct portions of the object to be X-rayed. In this manner the exposure time is minimized because the highest flux density of X-ray photons is being used and also maximum uniformity of exposure is being obtained.

An X-ray lobe aligning apparatus, forming another embodiment of the present invention, is shown in FIGS. 1 and 24–26. An illuminating marker means for example, a cross-hair projector 177 is mounted on the unit, whereby an illuminated cross-hair is projected on the object to be X-rayed with the center of the cross-hair coinciding with the center of the X-ray lobe, said lobe subtending a cone of angles of approximately between 15° and 30°.

Referring to FIG. 24, a schematic representation of the projector 177 and X-ray source is shown. A lamp 178 directs a light beam substantially transversely to the direction of the X-ray lobe emanating from point X and having a cone angle α and the light source projects an image of the cross-hair 179 disposed within an aperture of a light shield 181 via an optical lens 182 and a mirror 183 onto an object 184 to be photographed (clearly shown in FIG. 25) as lines 179'. The purpose of mirror 183 is to reflect the cross-hair image such that the projected axis of the cross-hair coincides with the axis of the X-ray lobe. The lens 182 has preferably a small focal length, for example less than 22 millimeters, and is adjustable to smaller focal lengths. The small focal length increases the depth of focused field so that the cross-hairs are in focus over a greater depth of field. The large adjustment on the focal length of lens 182 allows one to adjust readily the projected angle α' of the cross-hairs to be equal to the angle α of the X-ray lobe without moving the light 178, light shield 181, lens 182, and/or mirror 183. When angle α is made equal to the cone angle of the X-ray lobe, the portion which is illuminated quickly indicates the portion which will be X-rayed with high photon flux density.

Referring to FIG. 26, there is shown the plan view of the cross-hair projector 177. The projected light beam from point Y to point Z is preferably bent twice so that the projector 177 will fit into the space available. The lamp 178, the light shield 181, and lens 182 are on a straight line perpendicularly disposed to the X-ray path. The light is reflected (about) 90° by a mirror 185, along a path that is still perpendicular to the X-rays. Then a mirror 186 bends the light across the axis of the X-ray lobe, where the third mirror 183 is disposed on the X-ray lobe axis to bend the light about 90° downward in the direction of the axis of the X-ray lobe so that the projected cross-hair coincides with the axis of the X-ray lobe.

Referring again to FIG. 1, the X-ray generator is preferably provided with a dosimeter 188 so that the X-ray exposure time is automatically controlled in the conventional manner. The dosimeter 188 is mounted directly in the path of the X-rays and made so that only a small fraction of the X-rays are absorbed therein, an amount just sufficient to operate the automatic controls (not shown).

The dosimeter 188 is pancake shaped, gas filled, and hollow inside, with interleaved parallel plates 189 being oppositely charged. When X-rays penetrate the dosimeter, the gas is ionized producing oppositely charged ion and electron particles. The charged particles are attracted by the charged plates and thereby form a space current. A measure of this ionization current indicates the amount of X-ray energy passing through the dosimeter.

Since many changes could be made in the above construction and apparently widely different embodiments of this invention could be made without departing from the scope thereof, it is intended that all matter contained in the above description or shown in the accompanying drawings shall be interpreted as illustrative and not in a limiting sense.

What is claimed is:
1. An X-ray apparatus comprising: accelerator means for accelerating a charged particle beam within a vacuum vessel, and a target assembly intercepting said charged particle beam to form X-rays, said target assembly comprising a movable target carried from a movable shaft with said target intercepting said beam, said shaft protruding through an aperture formed in a wall of said vacuum vessel thereby being movable relative to said accelerator means, and a bellows sealed in vacuum tight relation between said aperture and said shaft whereby said shaft is allowed to move relative to said wall, and means for guiding a cooling fluid through said shaft to cool said target and for returning said fluid.

2. An X-ray machine comprising: accelerator means for accelerating a charged particle beam within a vacuum vessel, a target assembly intercepting said charged particle beam to form X-rays, said target assembly comprising a tube portion disposed through an aperture in a wall of said vacuum vessel, a thimble sealed across said tube and serving to close off the end of said tube portion, said thimble being of a ductile metal and of good thermal conductivity, a refractory heavy metal annular X-ray target disposed around said thimble, said thimble having a greater thermal conductivity than said annular target, and means for circulating cooling fluid through said tube portion to cool said thimble and target.

3. An X-ray machine comprising: accelerator means for accelerating a charged particle beam within a vacuum vessel, a target assembly intercepting said charged particle beam to form X-rays, said target assembly comprising a tube portion disposed through an aperture in a wall of said vacuum vessel, a thimble sealed across said tube portion, said thimble having internal flutes for increasing the internal area within said thimble, a metal sleeve disposed around said thimble, said metal sleeve being of a metal chosen for high conductivity, good vacuum characteristics and ductility, and chosen from the group consisting of gold, silver and copper, an annular target disposed on said metal sleeve, means for rotating said tube and target relative to said accelerator means whereby a different successive space displaced portion of said target intercepts said beam in time displaced intervals, and means for directing coolant through said tube portion for cooling said target.

References Cited

UNITED STATES PATENTS

| | | | |
|---|---|---|---|
| 1,612,641 | 12/1926 | Morrison | 250—93 |
| 1,621,926 | 3/1927 | Fujimoto | 313—330 |
| 1,893,759 | 1/1933 | Bouwers | 313—60 |
| 2,030,561 | 2/1936 | Andrew | 313—32 |
| 2,090,582 | 8/1937 | Mesick | 313—60 |
| 2,209,963 | 8/1940 | Du Mond | 250—89 |
| 2,229,152 | 1/1941 | Walsweer | 313—46 |
| 2,274,865 | 3/1942 | Machlett | 313—60 |
| 2,290,226 | 7/1942 | Du Mond | 313—60 |
| 2,315,280 | 3/1943 | Skehan et al. | 313—60 |
| 2,342,789 | 2/1944 | Cassen | 313—330 |
| 2,488,200 | 11/1949 | Juhlin et al. | 313—60 |
| 2,493,606 | 1/1950 | Waterton | 250—89 |
| 2,497,479 | 2/1950 | Vlach | 313—60 |
| 2,549,614 | 4/1951 | Leighton | 313—40 |
| 2,569,872 | 10/1951 | Skehan et al. | 313—57 |
| 2,572,551 | 10/1951 | Wideroe | 328—233 |
| 2,709,752 | 5/1955 | Parrish et al. | 250—51.5 |
| 2,798,178 | 7/1957 | Heard et al. | 313—62 |
| 2,825,833 | 3/1958 | Yanagisawa et al. | 313—62 |
| 2,829,271 | 4/1958 | Boucher | 250—89 |
| 2,836,750 | 5/1958 | Weimer | 313—163 |
| 2,836,757 | 5/1958 | Atlee | 313—330 |
| 2,842,677 | 7/1958 | Hosemann | 250—49.5 |
| 2,849,634 | 8/1958 | Crowley-Milling | 313—57 |
| 2,856,534 | 10/1958 | Meryman | 250—40.5 |
| 2,900,543 | 8/1959 | Heuse | 313—60 |
| 2,926,269 | 2/1960 | Broad | 313—60 |
| 2,926,270 | 2/1960 | Zunick | 313—60 |
| 2,946,892 | 7/1960 | Bas-Taymaz | 250—99 |
| 3,024,379 | 3/1962 | Verster | 313—62 |
| 3,079,605 | 2/1963 | Thomas et al. | 277—27 |
| 3,193,717 | 7/1965 | Nunan | 313—76 |

OTHER REFERENCES

Miller: The M-V Gazette; November 1954; p. 440 cited.

JAMES W. LAWRENCE, *Primary Examiner.*

R. SEGAL, *Assistant Examiner.*